(12) United States Patent
Marsh

(10) Patent No.: US 10,992,001 B2
(45) Date of Patent: Apr. 27, 2021

(54) ENERGY DISTRIBUTION SYSTEM

(71) Applicant: Mykal Marsh, Saint Albans, NY (US)

(72) Inventor: Mykal Marsh, Saint Albans, NY (US)

(*) Notice: Subject to any disclaimer, the term of this patent is extended or adjusted under 35 U.S.C. 154(b) by 357 days.

(21) Appl. No.: 15/996,019

(22) Filed: Jun. 1, 2018

(65) Prior Publication Data
US 2018/0351223 A1 Dec. 6, 2018

Related U.S. Application Data

(60) Provisional application No. 62/515,686, filed on Jun. 6, 2017.

(51) Int. Cl.
| | |
|---|---|
| *H01M 12/00* | (2006.01) |
| *H01M 2/30* | (2006.01) |
| *H02N 3/00* | (2006.01) |
| *H01M 50/543* | (2021.01) |
| *H05H 1/16* | (2006.01) |

(52) U.S. Cl.
CPC ....... *H01M 12/005* (2013.01); *H01M 50/543* (2021.01); *H02N 3/00* (2013.01); *H05H 1/16* (2013.01)

(58) Field of Classification Search
CPC .... H01M 12/005; H01M 50/543; H02N 3/00; H05H 1/16; Y02E 60/10
USPC .......................................................... 307/149
See application file for complete search history.

(56) References Cited

U.S. PATENT DOCUMENTS

| | | | |
|---|---|---|---|
| 6,645,663 B2 | 11/2003 | Bean et al. | |
| 8,115,454 B2* | 2/2012 | Cintra ................. | H01M 10/058 320/140 |
| 2006/0078786 A1 | 4/2006 | Wu | |
| 2008/0048456 A1 | 2/2008 | Browning et al. | |
| 2012/0112468 A1* | 5/2012 | Najt ....................... | F02B 71/04 290/1 A |
| 2012/0319408 A1 | 12/2012 | Plotsker | |
| 2013/0188283 A1 | 7/2013 | Midholm et al. | |
| 2014/0163664 A1* | 6/2014 | Goldsmith ....... | A61B 17/12181 623/1.11 |
| 2019/0321613 A1* | 10/2019 | Jones ................. | A61K 31/7088 |

* cited by examiner

*Primary Examiner* — Rexford N Barnie
*Assistant Examiner* — Xuan Ly
(74) *Attorney, Agent, or Firm* — Boudwin Intellectual Property; Daniel Boudwin

(57) ABSTRACT

An energy distribution system. The energy distribution system has a housing with a rear terminal and a front terminal. An inlet unit receives air therethrough. The inlet unit then passes the air through a one-way valve into a reservoir where the air molecules undergo ionization. Once ionized, the gaseous air is converted into a plasma state. After being converted into the plasma state, electric energy is generated by a pair of magnets and stored in a capacitor.

7 Claims, 1 Drawing Sheet

ENERGY DISTRIBUTION SYSTEM

CROSS REFERENCE TO RELATED APPLICATIONS

This application claims the benefit of U.S. Provisional Application No. 62/515,686 filed on Jun. 6, 2017. The above identified patent application is herein incorporated by reference in its entirety to provide continuity of disclosure.

BACKGROUND OF THE INVENTION

Many electronic devices are powered by batteries. Batteries typically feature a set amount of power which, after the power is consumed, the batteries must be thrown away or recycled. Dangerous chemicals can leak from the batteries and cause harm to the environment, particularly during the disposal of such batteries. Some brands of batteries may be inefficient and incapable of supplying power for an extended period of time.

Therefore, because of the harm to the environment caused by current energy distribution systems as well as the inefficiency of such devices, there is a need in the prior art for a battery that is both environmentally safe and provides more efficient performance.

SUMMARY OF THE INVENTION

In view of the foregoing disadvantages inherent in the known types of energy distribution systems now present in the prior art, the present invention provides an energy distribution system wherein the same can be utilized for providing convenience for the user when providing energy to an electronic device.

The present system comprises a housing defining a cavity and having a rear terminal defined opposite a front terminal. An inlet unit is disposed within the housing in fluid communication with the rear terminal. The inlet unit comprises a pair of opposing pistons. A pair of pressurized gas chambers are disposed on an exterior surface of each of the pair of opposing pistons. A reservoir is disposed in the housing placed adjacent to the inlet opposite of the rear terminal. A second pair of opposing magnets are disposed in the housing placed adjacent to the reservoir opposite of the rear terminal. A capacitor is disposed in the cavity between the second pair of opposing magnets and the front terminal.

Another object of the present invention is to provide a first power source operably connected to the pair of opposing pistons.

Yet another object of the present invention is to provide an energy distribution system wherein the second pair of opposing magnets is a pair of permanent magnets.

Another object of the present invention is to provide a second power source operably connected to the second pair of opposing magnets.

A further object of the present invention is to provide an energy distribution system wherein the pair of pressurized gas chambers contains nitrogen gas.

Yet a further object of the present invention is to provide an energy distribution system wherein the reservoir contains a salt dissolved in water.

Another object of the present invention is to provide an air ionizer disposed in the reservoir and configured to ionize air passing through a tapered tunnel thereof.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
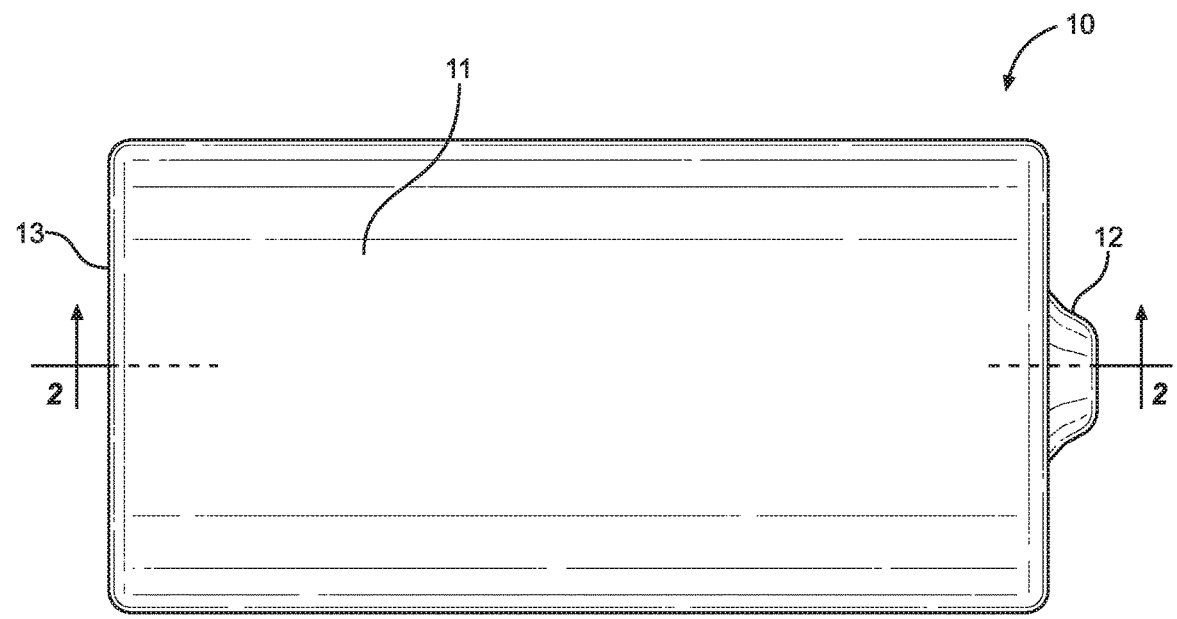
FIG. 1 shows a side view of the energy distribution system.

Reference is made herein to the attached drawings. Like reference numerals are used throughout the drawings to depict like or similar elements of the energy distribution system. The figures are intended for representative purposes only and should not be considered to be limiting in any respect.

Referring now to FIG. 1, there is shown a side view of the energy distribution system. The energy distribution system 10 comprises a housing 11 having a front terminal 12 opposite of a rear terminal 13. In one embodiment, the housing is cylindrical in shape. In another embodiment, the housing is made of a material configured to reduce magnetic interference in an area surrounding the energy distribution system 10. In this way, magnetic forces generated within the housing 11 are constrained within the energy distribution system 10 such that the operation of an electronic device is not altered thereby.

Figure 2:
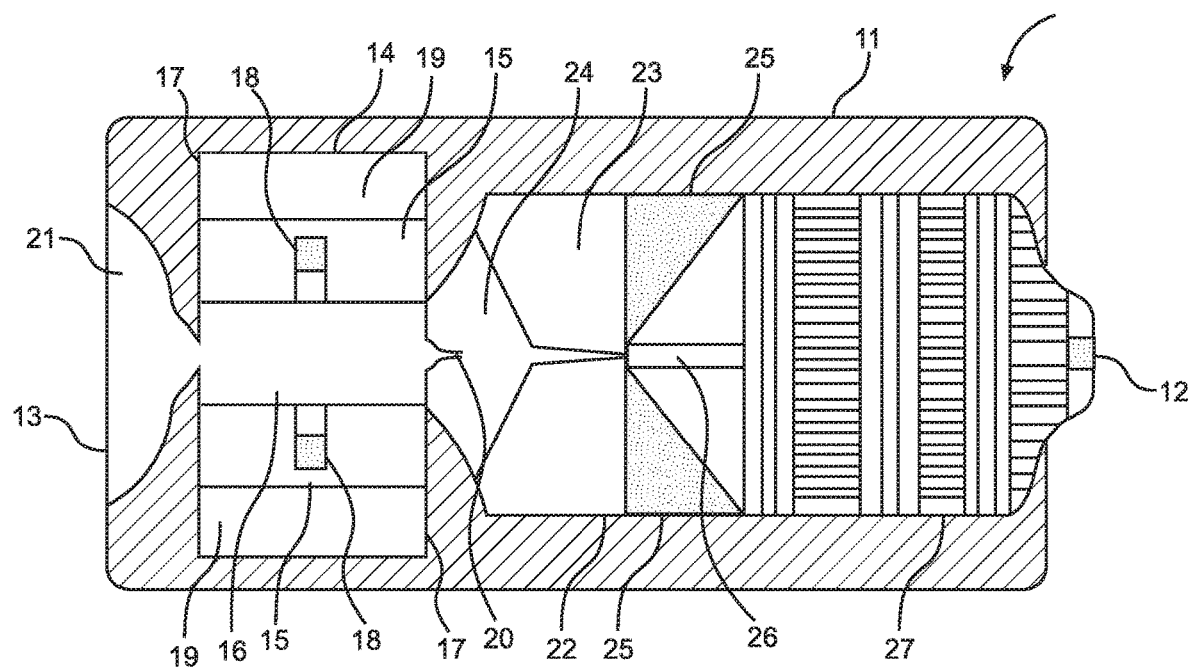
FIG. 2 shows a cross-sectional view of the energy distribution system.

Referring now to FIG. 2, there is shown a cross-sectional view of the energy distribution system. An inlet unit 14 is placed in the housing 11 in fluid communication with the rear terminal 13. The inlet unit 14 comprises a pair of opposing pistons 15 placed opposite of each other defining a passage 16 therebetween. The opposing pistons 15 are disposed in a corresponding number of opposing wells 17 configured to retain the alignment of the opposing pistons 15. A pair of opposing magnets 18 are embedded in the opposing pistons 15 in a portion of each piston 15 proximal to the passage 16. In one embodiment, the opposing pistons 15 are made of a non-magnetic material.

The opposing pistons 15 are sized to create an airtight chamber 19 in each well of the pair of opposing wells 17. The airtight chamber 19 is configured to be filled with a pressurized gas wherein the pressurized gas will apply pressure to the opposing pistons 15 in a direction opposite of a magnetic force exerted by the opposing magnets 18 on each other. In one embodiment, the pressurized gas is nitrogen gas.

The first pair of opposing magnets 18 is comprised of a first magnet and a second magnet wherein the magnets are configured to exert a repellant force upon each other. For example, the first magnet and second magnet may be configured to exert a negative force towards the passage 16 thus resulting in a repellant force between the first magnet and the second magnet.

The inlet unit 14 further comprises a one-way valve 20 disposed in the housing proximally to the pair of opposing pistons 15 and opposite of the rear terminal 13. The one-way valve 20 is configured to allow air flow through the channel 16 from the rear terminal 13 to a reservoir 22. As the pair of opposing pistons 15 are subjected to opposing forces generated from the first pair of opposing magnets 18 and the pressurized gas of the airtight chamber 19, air will be drawn in through an open end 21 of the rear terminal 13. In another embodiment, the pair of opposing pistons 15 are operably connected to a power source.

The reservoir 22 is disposed in the housing 11 between the inlet unit 14 and a second pair of opposing magnets 25. The reservoir 22 comprises a hollow casing 23 with an ionizing material disposed therein. In one embodiment, the ionizing material is sodium chloride dissolved in water at a desired concentration. The reservoir 22 contains a tunnel 24 therethrough. In a further embodiment, the reservoir 22 houses an air ionizer operably connected to the power source and configured to ionize air passing through the tunnel 24. In one embodiment, the tunnel is tapered from a first end thereof to a second end thereof.

The second pair of opposing magnets 25 is disposed in the housing 11 between the reservoir 22 and a capacitor 27. The second pair of opposing magnets 25 is configured to generate a magnetic force that will draw the ionized air through a lane 26 therebetween. As pressure rises in the energy distribution system, gaseous ionized air will be converted into plasma. Due to the forces exerted by the second pair of opposing magnets upon the plasma, an electric charge will be generated. In one embodiment, the second pair of opposing magnets 25 are operably connected to a power source. In another embodiment, the second pair of opposing magnets 25 comprise a pair of permanent magnets. In one embodiment, an electromagnet is disposed between the second pair of opposing magnets 25 and the capacitor 27. The electromagnet is configured to further concentrate the electric charge.

The capacitor 27 is disposed within the housing 11 between the second pair of opposing magnets 25 and the front terminal 12. In one embodiment, the capacitor 27 is configured to multiply the electrical output of the energy distribution device 10. In another embodiment, the capacitor 27 is configured to store the generated electric charge therein. In one embodiment, the capacitor 27 comprises a plurality of separated aluminum plates. The rear terminal 13 and the front terminal 12 are configured to act as terminals through which an electric current may flow to power an electronic device.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An energy distribution system, comprising:
    a housing defining a cavity having a rear terminal with an open end opposite of a front terminal;
    an inlet unit disposed in the housing at a rear end thereof wherein the inlet comprises a pair of opposing pistons disposed in a pair of opposing wells;
    wherein the inlet unit is in fluid communication with the rear terminal;
    a first pair of opposing magnets embedded in the pair of opposing pistons;
    a pressurized gas disposed in a pair of airtight chambers formed by the pair of opposing pistons and the pair of opposing wells;
    a reservoir disposed in the housing between the inlet and a second pair of opposing magnets;
    the reservoir comprising an air ionizer configured to ionize air passing through a tunnel therethrough;
    the second pair of opposing magnets disposed in the housing between the reservoir and a capacitor; and
    the capacitor disposed in the cavity between the second pair of opposing magnets and the front terminal.

2. The energy distribution system of claim 1, further comprising a first power source operably connected to the pair of opposing pistons.

3. The energy distribution system of claim 1, wherein the second pair of opposing magnets is comprised of a pair of permanent magnets.

4. The energy distribution system of claim 1, wherein a second power source is operably connected to the second pair of opposing magnets.

5. The energy distribution system of claim 1, wherein the pair of airtight chambers contain nitrogen gas therein.

6. The energy distribution system of claim 1, wherein the reservoir contains a mixture of a salt and water therein.

7. The energy distribution system of claim 1, wherein an electromagnet is disposed between the second pair of opposing magnets and the capacitor.

* * * * *